United States Patent
Yamamura et al.

(10) Patent No.: US 7,372,683 B2
(45) Date of Patent: May 13, 2008

(54) OVER VOLTAGE DETECTION CIRCUIT, AND POWER SOURCE CIRCUIT, POWER SUPPLY SYSTEM AND ELECTRONIC APPARATUS USING THE OVER VOLTAGE DETECTION CIRCUIT

(75) Inventors: Hideho Yamamura, Oiso (JP); Naoki Maru, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/212,795

(22) Filed: Aug. 7, 2002

(65) Prior Publication Data

US 2003/0030955 A1 Feb. 13, 2003

(30) Foreign Application Priority Data

Aug. 7, 2001 (JP) ............................. 2001-239092

(51) Int. Cl.
*H02H 3/22* (2006.01)
(52) U.S. Cl. ...................................... 361/91.1; 361/111
(58) Field of Classification Search ................. 361/18, 361/21, 91.1, 92, 86–90, 91.3, 111, 23, 79, 361/91.2
See application file for complete search history.

(56) References Cited

U.S. PATENT DOCUMENTS

| 3,633,101 | A | * | 1/1972 | Johnson et al. | ............. | 324/102 |
| 4,628,433 | A | * | 12/1986 | Notohamiprodjo | ............ | 363/65 |
| 5,023,476 | A | * | 6/1991 | Watanabe et al. | ............ | 327/540 |
| 5,375,032 | A | * | 12/1994 | Hatakeyama et al. | ....... | 361/187 |
| 5,382,839 | A | * | 1/1995 | Shinohara | .................... | 327/545 |
| 5,498,985 | A | * | 3/1996 | Parle et al. | .................... | 327/74 |
| 5,629,608 | A | * | 5/1997 | Budelman | .................... | 323/268 |
| 6,127,879 | A | * | 10/2000 | Willis et al. | ................. | 327/408 |
| 6,169,808 | B1 | * | 1/2001 | Kim | ............................ | 381/107 |
| 6,301,133 | B1 | * | 10/2001 | Cuadra et al. | ................ | 363/65 |
| 6,320,363 | B1 | * | 11/2001 | Oglesbee et al. | ............ | 323/303 |
| 6,894,882 | B2 | * | 5/2005 | Maru et al. | ................. | 361/91.1 |

FOREIGN PATENT DOCUMENTS

| JP | 01-174221 | 7/1989 |
| JP | 5-236680 | 9/1993 |
| JP | 07-177738 | 7/1995 |
| JP | 7-322609 | 12/1995 |
| JP | 10-243644 | 9/1998 |
| JP | 2000-245146 | 9/2000 |
| JP | 2001-169459 | 6/2001 |

* cited by examiner

*Primary Examiner*—Robert L. Deberadinis
*Assistant Examiner*—Danny Nguyen
(74) *Attorney, Agent, or Firm*—Antonelli, Terry, Stout & Kraus, LLP.

(57) ABSTRACT

An over voltage detection circuit, which is used in a power source, a power supply system, and an electronic apparatus, includes two voltage comparison circuits. A first comparison circuit, provided for high-speed signal responses, includes voltage dividing resistors, a voltage comparator, and a reference voltage source, while a second comparison circuit, provided for low-speed signal responses, includes voltage dividing resistors, a capacitor, a voltage comparator, and a reference voltage source. The second comparison circuit, which has the capacitor, is for low-speed-signal responses and does not respond to high-speed input changes, that is, high-frequency components. The first comparison circuit, which has no capacitor, responds to any frequency components including high-speed signals and high frequency components. A high setting voltage is selected for the first comparison circuit, while a low setting voltage for the second comparison circuit.

24 Claims, 4 Drawing Sheets

311,312,321,322
: VOLTAGE-DIVIDING RESISTOR
317,327 : VOLTAGE COMPARATOR
318,328 : REFERENCE VOLTAGE SOURCE
323 : CAPACITOR

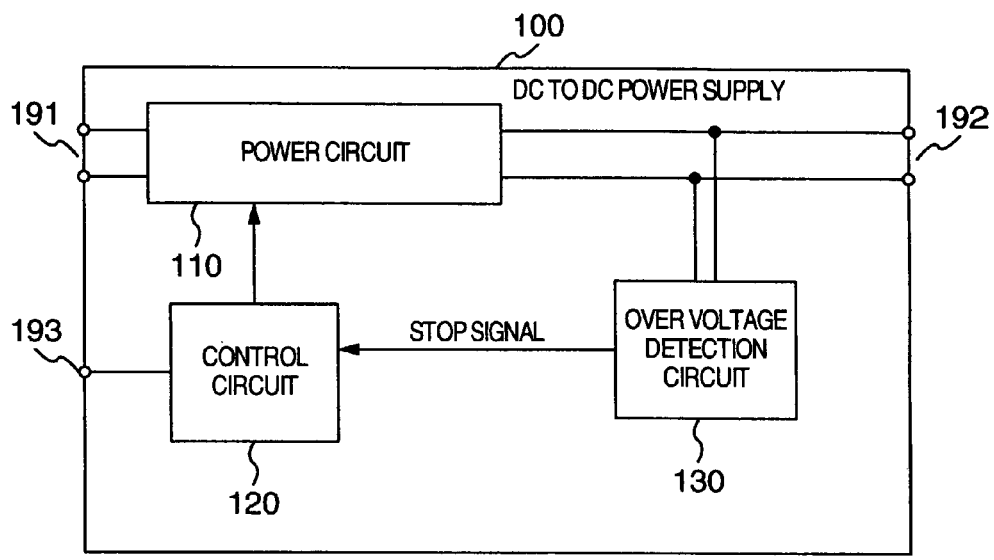
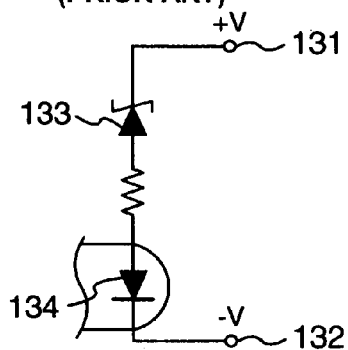
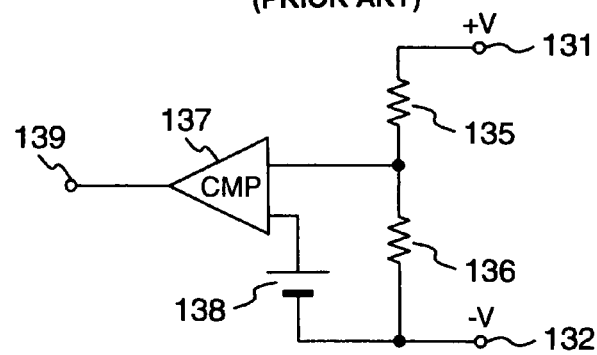

US 7,372,683 B2

OVER VOLTAGE DETECTION CIRCUIT, AND POWER SOURCE CIRCUIT, POWER SUPPLY SYSTEM AND ELECTRONIC APPARATUS USING THE OVER VOLTAGE DETECTION CIRCUIT

BACKGROUND OF THE INVENTION

The present invention relates to a technology that is advantageously applied to arrangements such as a power source circuit, a power supply system, and an electronic apparatus using an over voltage detection circuit.

The technologies studied by the inventors of the present invention for a power source circuit, a power supply system, and an electronic apparatus include the following. For example, a power supply used for an electronic apparatus is usually equipped with an over voltage detection circuit for protecting the power supply itself and the elements of electronic circuits that are the load.

In general, many electronic apparatuses are configured as shown in FIG. 6. Referring to FIG. 6, an electronic apparatus 10 comprises a power supply system 20 and an electronic circuit 30. The power supply system 20 comprises a DC to DC power supply 100 and an AC to DC power supply 200. The power supply system 20 receives power, such as commercial AC power, from a power receiving terminal 40, uses the AC to DC power supply 200 to convert the received power to DC power, and uses the DC to DC power supply 100 to generate a desired-level of the DC voltage.

FIG. 7 shows the general configuration of a DC to DC power supply. Referring to FIG. 7, the DC to DC power supply 100 comprises a power circuit 110, a control circuit 120, and an over voltage detection circuit 130. The power circuit 110 receives power from input terminals 191 and outputs a desired-level, stabilized DC voltage to output terminals 192. The control circuit 120 turns the power circuit 110 on or off according to a signal received via a control terminal 193. The over voltage detection circuit 130, usually connected to the output terminal 192, outputs a stop signal when the output voltage becomes abnormally high, and stops the operation of the power circuit 110 via, or sometimes not via, the control circuit 120.

One prior-art disclosures dealing with an over voltage detection circuit is found, for example, in JP-A-7-322609, and such a circuit is shown in FIG. 8. In the over voltage detection circuit shown in FIG. 8, terminals 131 and 132 are connected to the output terminals of the power supply. A Zener diode 133 checks if the voltage across the terminals 131 and 132 is equal to or higher than a predetermined setting value and, if the voltage is equal to or higher than the predetermined value, a photo-coupler 134 sends the stop signal. When the power supply fails and the output voltage reaches the predetermined value, this over voltage detection circuit stops the operation of the power supply.

Another example of an over voltage detection circuit is shown in FIG. 9. Referring to FIG. 9, the terminal 131 is connected, via voltage dividing resistors 135 and 136, to a comparator 137 that compares the voltage with the voltage of a reference voltage source 138. If the voltage of the terminal 131 is equal to or higher than a predetermined setting value determined by a reference voltage source 138 and the voltage dividing resistors 135 and 136, the stop signal is output from a signal output terminal 139. When the power supply fails and the output voltage reaches a predetermined value, this over voltage detection circuit stops the operation of the power supply. It should be noted that the voltage dividing resistors 135 and 136 are provided to enable a predetermined voltage, which will be compared, to be set, changed, and adjusted easily.

The over voltage detection circuit described above prevents the output voltage of the power supply from being above a predetermined setting value. It also protects a circuit which is a load from being damaged, and protects the internal components of the power supply itself from being damaged.

SUMMARY OF THE INVENTION

However, because the difference between the power supply rated voltage and the absolute maximum rated voltage of a semiconductor device has recently become smaller, and because, in a redundant parallel power supply system employed for increasing the reliability of the power supply, the setting value of an over voltage detection circuit is set to a voltage close to the rated voltage of a semiconductor device, conventional over voltage detection circuits produce some problems.

For example, when the absolute maximum rated voltage of a semiconductor device is 110% and the allowable operation range is ±5%, that is, from 95% to 105%, of the rated voltage, and when the power supply noise generated by the operation of a semiconductor device reaches ±5% of the rated voltage, the over voltage detection circuit must be set equal to or higher than 105% and equal to or lower than 110%, that is, within 107.5%±2.5%, of the rated voltage. However, it is sometimes difficult to attain this precision because of problems associated with the design of an over voltage detection circuit, such as the cost.

A redundant parallel power supply system sometimes creates more difficult problems. A redundant parallel power supply system is used such that, where N power source circuits are required for the load current, more power source circuits, for example, N+1 circuits, are provided for parallel operation. Even if one of them fails, this configuration ensures continued normal operation on the other N circuits and increases the reliability of the power supply system. This power system allows an electronic apparatus to continue the normal operation, and to increase the reliability of the electronic apparatus.

In such a redundant parallel power supply system, the need to keep the output voltage within the allowable operation range of a semiconductor device requires the voltage of the over voltage detection circuit to be set within the allowable operation range of the semiconductor device. However, the operation of a semiconductor device sometimes generates power supply noises that nearly reach the allowable operation range. In such a case, the voltage of the over voltage detection circuit cannot be set, that is, a contradicting condition occurs that the design range becomes zero or negative. For example, when the allowable operation range is ±5% of the rated voltage, that is, from 95% to 105%, and when the power supply noise generated by the operation of the semiconductor device is ±5% of the rated voltage, that is, from 95% to 105%, of the rated voltage, the voltage of the over voltage detection circuit must be set equal to or higher than 105% and equal to or lower than 105% of the rated voltage. This is impossible to implement.

To solve this situation, it is an object of the present invention to provide a technology that makes it possible to design an over voltage detection circuit even under conditions in which it could not be designed in the prior art. It is also an object to provide a technology that protects devices from being damaged or from malfunctioning by introducing means for implementing the time response characteristics to an over voltage detection circuit with particular attention to the noise characteristics of the power supply voltage or to the nature of the allowable operation range of a semiconductor device.

To achieve the above and other objects, an over voltage detection circuit according to the present invention has two or more different response speeds and two or more different setting voltages. Alternatively, the over voltage detection circuit comprises two or more voltage comparators each having its own response speed and setting voltage. In addition, the present invention may be applied to a power source circuit that uses the over voltage detection circuit, a power supply system that uses such a power source circuit, and an electronic apparatus that uses such a power supply system.

More specifically, the over voltage detection circuit takes advantage of the characteristics or the nature described below. For example, the power supply noise characteristics have a time response nature. Power supply noises are primarily generated by a change in the current consumed by the operation of an electronic circuit that is the load, and the voltage amplitude of noises Vn is the product of the output impedance Z of the power supply and the change amount ΔI of the current consumption. That is, Vn=Z×ΔI. Here, because the output impedance Z of the power supply has frequency characteristics and the stabilization effect of the output voltage of the power supply is not active at a high frequency, the output impedance becomes the impedance of a capacitor provided at the output terminal. On the other hand, at low frequencies at which the power supply responds, the stabilization effect is active and the output impedance is low. Classifying noise voltage amplitudes into frequency components indicates that a noise voltage amplitude at a frequency lower than the response threshold frequency of the power supply stabilization effect is low and that the noise voltage amplitude at a frequency higher than the response threshold frequency is high. Therefore, at a frequency lower than the response threshold frequency, the noise voltage amplitude is lower than the voltage amplitude of all noises.

The design of an over voltage detection circuit in accordance with the present invention is made possible by introducing the time response characteristics to an over voltage detection circuit with particular attention on this nature. More specifically, a low setting voltage is set for low frequencies, and a high setting voltage is set for high frequencies.

Also, the nature of the allowable operation range of a semiconductor device includes a time response nature. For example, assume that the allowable operation range of a semiconductor is ±5% of the rated voltage and that the generated power supply noise is ±4% of the rated voltage. In this case, for a rated power supply voltage, if the operation reliability of a semiconductor device is 10 years, that is, only one malfunction in 10 years, setting the power supply voltage to 105% of the rated voltage does not stop the operation of the semiconductor device but does decrease the operation reliability. For example, the reliability is decreased to such an extent that one malfunction occurs in one hour. In this example, a 5% increase in the power supply voltage decreases the operation reliability from 10 years (about 90000 hours) to one hour, that is, a decrease by 1/90000. By increasing the power supply voltage by another 5% to 110% of the rated voltage, the operation reliability is decreased by another 1/90000 and the operation reliability is one-hour/90000, that is, 0.04 second. 107.5% of the rated voltage results in 12 seconds of operation reliability. Due to this fact, it can be said that the operation of the power supply voltage at 107.5% of the rated voltage is allowable for a short period of time and that the effect on the operation reliability may be ignored if the operation is performed for about one second. The same holds true with regard to the absolute maximum rating of a semiconductor device.

By establishing the time response characteristics of an over voltage detection circuit based on the above-discussed nature of semiconductor devices, the design of an improved over voltage detection circuit is made possible. More specifically, a low setting voltage is used for a long time, and a high setting voltage for a short time.

As described above, providing means for implementing time response characteristics for an over voltage detection circuit makes it possible to design an improved over voltage detection circuit.

Other objects, features and advantages of the invention will become apparent from the following description of the embodiments of the invention taken in conjunction with the accompanying drawings.

BRIEF DESCRIPTION OF THE DRAWINGS

FIG. 7 is a functional block diagram of a general DC to DC power supply used in the art related to the present invention.

FIG. 8 is a circuit diagram of a general over voltage detection circuit used in the art related to the present invention.

FIG. 9 is a circuit diagram of another general over voltage detection circuit used in the art related to the present invention.

DETAILED DESCRIPTION OF THE EMBODIMENTS

Figure 1:
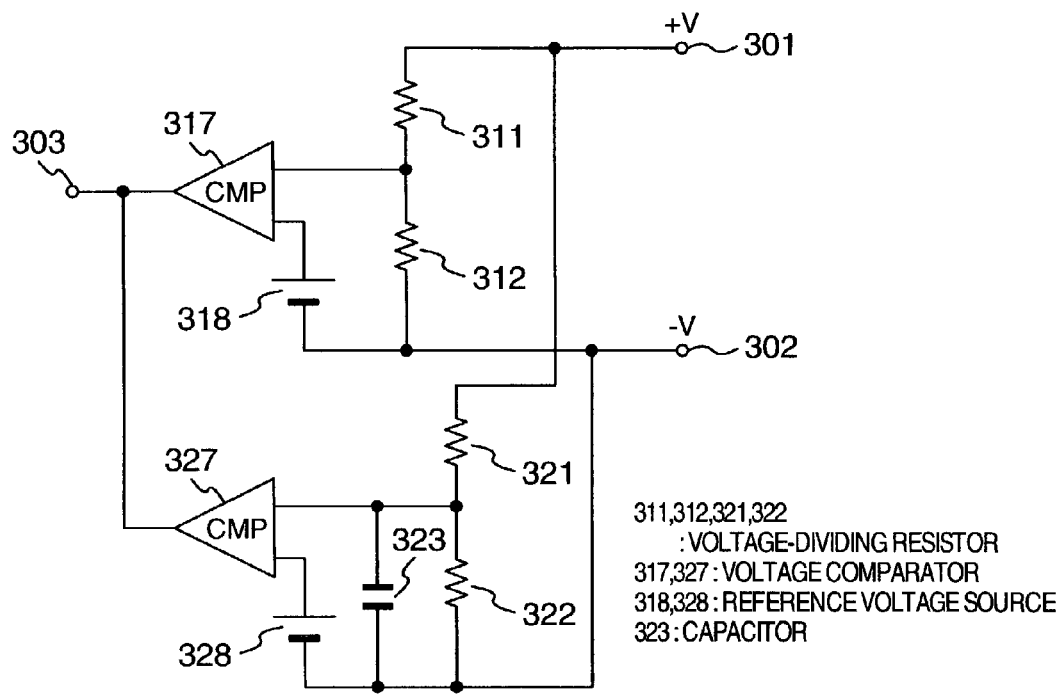
FIG. 1 is a circuit diagram of an over voltage detection circuit in accordance with a first embodiment of the present invention.

Some embodiments of the present invention will be described below with reference to the drawings. Here, it should be noted that like reference numerals represent like elements throughout the description of the embodiments and that the same description is not repeated regarding such like elements.

FIG. 1 is a circuit diagram of an over voltage detection circuit in accordance with a first embodiment of the present invention. The over voltage detection circuit shown in FIG. 1 has two voltage comparison circuits. Terminals 301 (+V: high potential side) and 302 (−V: low potential side) are connected to the output terminal of the power supply, and a terminal 303 is connected to a control circuit, respectively. A first comparison circuit of the two voltage comparison circuits, which is for high-speed-signal responses, comprises voltage dividing resistors 311 and 312, a voltage comparator 317, and a reference voltage source 318. The voltage dividing resistors 311 and 312 are connected in series across the terminal 301 and the terminal 302. The connection point between the voltage dividing resistors 311 and 312 is connected to one of the inputs of the voltage comparator 317, and the reference voltage is input from the reference voltage source 318 to the other input of the voltage comparator 317.

On the other hand, a second comparison circuit, which is for low-speed-signal responses, comprises voltage dividing resistors 321 and 322, a capacitor 323, a voltage comparator 327, and a reference voltage source 328. The voltage dividing resistors 321 and 322 are connected in series across the terminal 301 and the terminal 302. The capacitor 323 is connected in parallel with one of the resistors, 322, and the connection point between the voltage dividing resistors 321 and 322 is connected to one of the inputs of the voltage comparator 327. The reference voltage is input from the reference voltage source 328 to the other input of the voltage comparator 327. The second comparison circuit, which has the capacitor 323, is for low-speed-signal responses and does not respond to high-speed input changes, that is, high-frequency components. On the other hand, the first comparison circuit, which has no capacitor, responds to any frequency components including high-speed signals and high frequency components. A high setting voltage is selected for the first comparison circuit, while a low setting voltage is selected for the second comparison circuit. However, in some implementations, a capacitor may be added in parallel to the resistor 312, or between the inputs of the comparator 317, in the first comparison circuit, for noise reduction purposes. This makes the topology of the first and second comparison circuits very similar, but the time constants of the two comparison circuits are different.

To solve the first problem described above, the first and second comparison circuits are set up as follows. In the high-speed-signal first comparison circuit, the voltage dividing resistors 311 and 312 and the reference voltage source 318 are selected so that the setting voltage of the voltage comparator 317 is set at 109% of the rated voltage. In the low-speed-signal second comparison circuit, the voltage dividing resistors 321 and 322 and the reference voltage source 328 are selected so that the setting voltage of the voltage comparator 327 is 106% of the rated voltage. Also, in the second comparison circuit, the capacitor 323 is selected so that the frequency range, to which the low-speed-signal second voltage comparator 327 responds, is within a frequency range that makes the output impedance of the power supply sufficiently small, with the response time being 1 second or shorter. This configuration allows the over voltage detection circuit to be designed even if the error of both comparison circuits is 3%.

That is, the setting voltage of the high-speed-signal voltage comparator 317 ranges from 106% to 112%, including errors. The minimum value of 106%, which is larger than the 105% of the noise potential, does not cause malfunctions, and the duration of the maximum value of 112%, though larger than the absolute maximum rated voltage of 110%, is shorter than one second. Therefore, they produce no problem. In addition, the setting voltage of the low-speed-signal voltage comparator 327 ranges from 103% to 109%, including errors. The minimum value of 103% does not cause malfunctions because of the reduced-noise frequency range, and the upper limit of 109% satisfies the condition because it does not exceed the absolute maximum rated voltage of a semiconductor device. Thus, an over voltage detection circuit may be designed using a voltage comparison circuit with an error of 3%. By contrast, in the prior art, an over voltage detection circuit cannot be designed using a voltage comparison circuit with an error of 3% because the allowable design requirement range is ±2.5%.

To solve the second problem described above, the setting voltage of the high-speed-signal first voltage comparator 317 is set to 107.5 ±2% of the rated voltage, and the setting voltage of the low-speed-signal second voltage comparator 327 is set to 104 ±1% of the rated voltage. Those voltage settings satisfy the design condition. At this time, although the maximum of the setting voltage of the over voltage detection circuit is 109.5%, its duration is one second or shorter. Therefore, no problem is produced. If an over voltage condition continues for one second or longer, the over voltage detection circuit operates at the maximum of 105% of the rated voltage. By contrast, in the prior art, the over voltage detection circuit cannot be designed under this condition.

Figure 2:
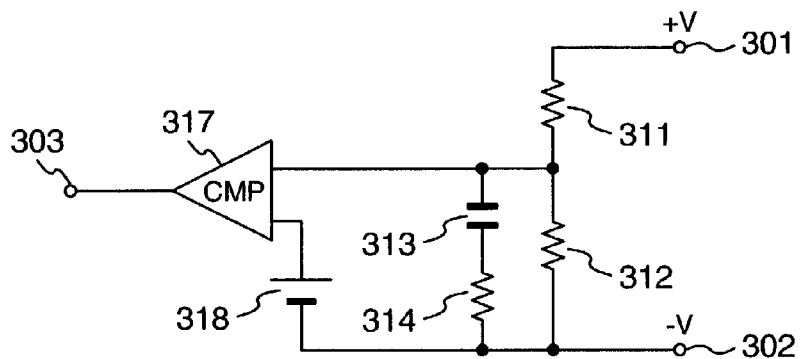
FIG. 2 is a circuit diagram of an over voltage detection circuit in accordance with a second embodiment of the present invention.

FIG. 2 is a circuit diagram of an over voltage detection circuit in accordance with a second embodiment of the present invention. The over voltage detection circuit shown in FIG. 2 has one voltage comparator. In addition to voltage dividing resistors 311 and 312 of the prior art arrangement shown in FIG. 9, a capacitor 313 and a resistor 314 are provided. The capacitor 313 and the resistor 314, which are in series, are connected in parallel with the voltage-dividing resistor 312. This circuit also has two setting voltages, one for high-speed signals and the other for low-speed signals. For low frequencies, including direct currents, the voltage division ratio of the voltage dividing circuit is determined by the resistances of voltage dividing resistors 311 and 312 because the impedance of the capacitor 313 is high. On the other hand, for high frequencies, the voltage division ratio is low and the setting voltage of the over voltage detection circuit is high because the impedance of the capacitor 313 is low and the resistor 314 is connected in parallel with the voltage dividing resistor 312. More specifically, the resistors 311, 312, and 314 should be selected so that the setting voltages for the high-speed signals and the low-speed signals are desired voltages, and the capacitor 313 should be selected so that the intermediate frequency between the high-speed signal and the low-speed signal, or its duration, is the desired value.

In the second embodiment, to solve the first and second problems described above, the design condition for an over voltage detection circuit is satisfied by selecting the setting voltages as in the first embodiment. Note that a circuit similar to that in FIG. 2, but without the resistor 314, is possible. However, such a modified circuit is a general noise-reduction circuit in which the resistor 312 is connected in parallel with the capacitor 313 and which has no multiple setting voltages. This circuit, which does not have the same effects of the present invention, may be distinguished from the circuit according to the present invention. On the other hand, a noise reduction capacitor can be added to the circuit of this invention.

Figure 3:
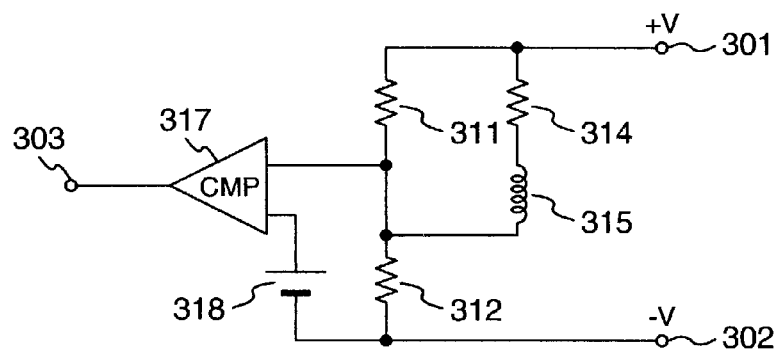
FIG. 3 is a circuit diagram of an over voltage detection circuit in accordance with a third embodiment of the present invention.

FIG. 3 is a circuit diagram of an over voltage detection circuit in accordance with a third embodiment of the present invention. In the over voltage detection circuit in FIG. 3, a voltage dividing circuit comprises voltage dividing resistors 311, 312, and 314, and a coil 315, in which the voltage dividing resistor 314 and the coil 315, connected in series, are in parallel with the voltage dividing resistor 311. This voltage dividing circuit, which is, in effect, a dual circuit of the voltage dividing circuit of the second embodiment in which a capacitor is used, may be designed to have the same characteristics as the circuit of the second embodiment. Therefore, this circuit gives the same effects as the circuit of the second embodiment.

Figure 4:
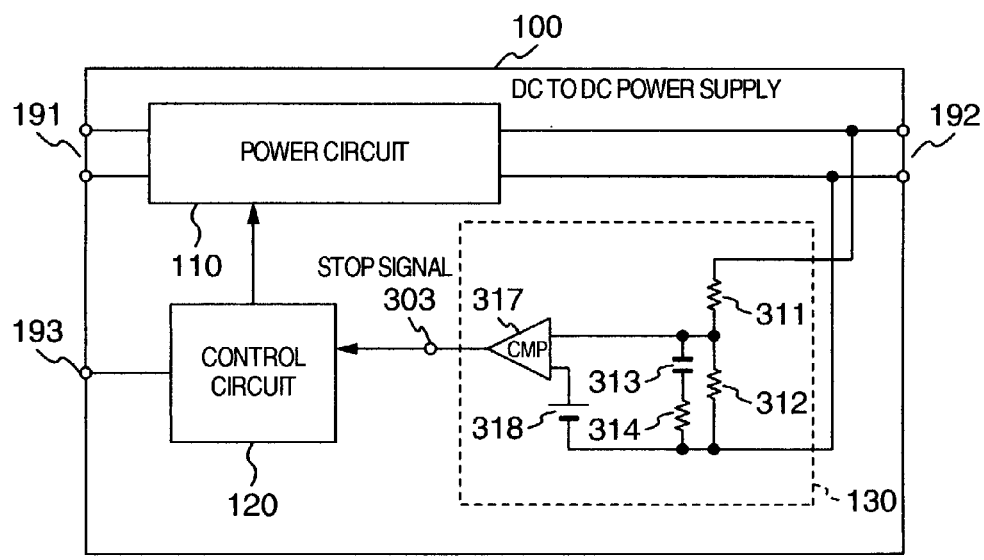
FIG. 4 is a functional block diagram of a power supply in accordance with a fourth embodiment of the present invention.

FIG. 4 is a functional block diagram of a power source circuit in accordance with a fourth embodiment of the present invention. A DC to DC power supply 100 in FIG. 4 comprises a power circuit 110 that receives power from input terminals 191 and outputs a desired-level, stabilized DC voltage to output terminals 192; a control circuit 120 that turns on or off the power circuit 110 according to a signal received via a control terminal 193; and an over voltage detection circuit 130 that is usually connected to the output terminal 192 and that outputs the stop signal when the output voltage becomes abnormally high to stop the operation of the power circuit 110 via, or sometimes not via, the control circuit 120. In the over voltage detection circuit 130, the over voltage detection circuit shown in the second embodiment is used. Therefore, this power source gives the same effect of the power supply with the over voltage detection circuit discussed above for the second embodiment, and may be used for designing the power supply.

Figure 5:
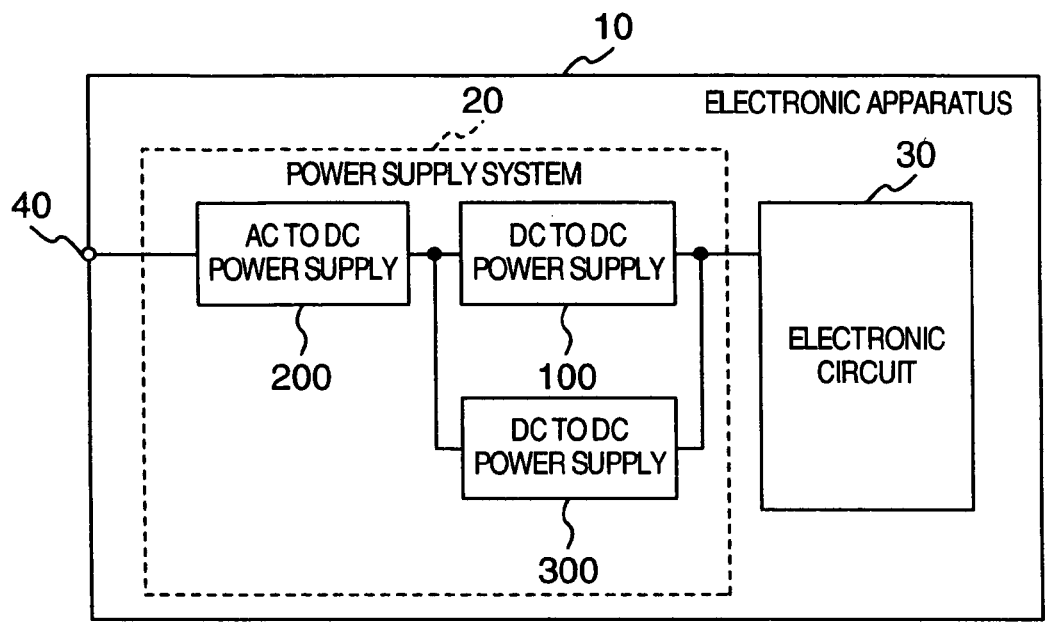
FIG. 5 is a functional block diagram of an electronic apparatus in accordance with fifth and sixth embodiments of the present invention.
Figure 6:
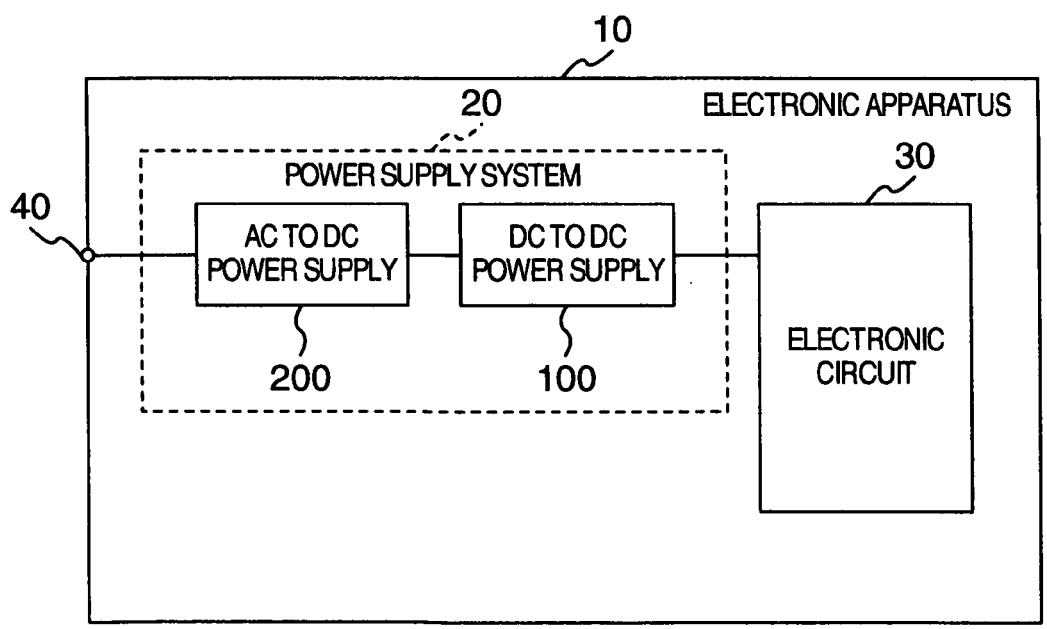
FIG. 6 is a functional block diagram of a general electronic apparatus used in the art related to the present invention.

FIG. 5 is a functional block diagram of an electronic apparatus in accordance with fifth and sixth embodiments of the present invention. An electronic apparatus 10 in FIG. 5 comprises a power supply system 20 that comprises DC to DC power supplies 100 and 300 and an AC to DC power supply 200 that receives power, such as commercial power, from a power receiving terminal 40, converts the received power to a DC current via the AC to DC power supply 200, and then converts the power to a desired-level, stabilized DC voltage via the DC to DC power supplies 100 and 300. The electronic apparatus 10 also includes an electronic circuit 30 that operates on the power supplied from the power supply system 20. The DC to DC power supplies 100 and 300, each of which is a power supply similar to that in the fourth embodiment described above, are arranged in a parallel configuration. Actually, the parallel configuration is a redundant parallel configuration in which each power supply has a circuit to perform parallel operation.

The power supply system 20 that comprises the DC to DC power supplies 100 and 300 is a fifth embodiment. This power supply system 20, which is stored in a cabinet with the electronic circuit 30 to which power is supplied, forms an electronic apparatus 10. This electronic apparatus 10 is a sixth embodiment. The fifth and sixth embodiments, which have substantially the same effect as the circuit of the fourth embodiment described above, enable a power supply system and an electronic apparatus to be designed.

As detailed in the embodiments described above, the technology according to the present invention enables an over voltage detection circuit to be designed even under load circuit conditions under which it could not be implemented in the prior art. Therefore, a power source, a power supply system, and an electronic apparatus having an over voltage detection circuit not implemented in the prior art can be implemented. That is, because it has been made clear that the noises or voltage characteristics of a semiconductor device produce no problem even if they exceed the ratings for a short time, an over voltage detection circuit satisfying those characteristics may be implemented. That is, the implementation of an over voltage detection circuit having setting voltages that differ between high-speed signals and low-speed signals makes it possible for an over voltage detection circuit to be designed even under conditions under which it could not be designed in the prior art, thus protecting the devices from being damaged or from malfunctioning.

With particular attention on the design conditions of an over voltage detection circuit that becomes more rigorous as the semiconductor device technology advances, and as a result of the study of the noise and voltage characteristics of a semiconductor device, the present invention has implemented an over voltage detection circuit that suits these characteristics. As the semiconductor technology further advances in the future, the technology according to the present invention will become an essential technology.

Although two setting voltages of an over voltage detection circuit, one for high-speed signals and the other for low-speed signals, are used in the embodiments described above, three or more setting voltages may also be possible and are included in the scope of the present invention.

The technology according to the present invention enables an over voltage detection circuit to be designed even under load circuit conditions under which it could not be implemented in the prior art. Therefore, a power source, a power supply system, and an electronic apparatus having an over voltage detection circuit not implemented in the prior art can be implemented through the use of the present invention. That is, an over voltage detection circuit can be designed even under conditions under which it could not be designed in the prior art and, therefore, it becomes possible to protect the devices from being damaged or from malfunctioning.

It should be further understood by those skilled in the art that although the foregoing description has been made based on a description of specific embodiments of the invention, the invention is not limited thereto and various changes and modifications may be made without departing from the spirit of the invention and the scope of the appended claims.

What is claimed is:

1. A power source circuit comprising a power source that outputs a DC (Direct Current) voltage and an over voltage detection circuit comprising a voltage comparator connected to the power source that detects that the DC voltage output from the power source has reached a predetermined setting voltage, wherein said over voltage detection circuit has two or more different response speeds and two or more different setting voltages each corresponding to one of the response speeds for over voltage detection for said power source to provide two or more independent determinations of an overvoltage condition, wherein said over voltage detection circuit provides said two or more different response speeds and said two or more different setting voltages for one power source, and wherein said voltage comparator outputs a first stop signal to stop operation of the power source in accordance with one of the different response speeds and one of the different setting voltages, and outputs a second stop signal to stop operation of the power source in accordance with another one of the different response speeds and another one of the different setting voltages, wherein the voltage comparator outputs the first and second stop signals independently of one another.

2. The power source circuit according to claim 1, further comprising means for stopping an operation of said power source in response to a stop signal that is output when said over voltage detection circuit has detected a predetermined voltage.

3. A power supply system comprising the power source circuit according to claim 1.

4. An electronic apparatus comprising the power supply system according to claim 3 and an electronic circuit that operates on power-supply power supplied from said power supply system.

5. A power source circuit according to claim 1, wherein said over voltage detection circuit outputs a digital signal for turning off or on the power circuit in accordance with whether or not an over voltage is detected by the over voltage detector.

6. A power source circuit comprising a power source that outputs a DC voltage and an over voltage detection circuit connected to the power source that detects that the DC voltage output from the power source has reached a predetermined setting voltage,
wherein said over voltage detection circuit comprises two or more voltage comparators to each separately detect an overvoltage condition at the output terminal of the power source circuit, each of said voltage comparators having its own response speed and setting voltage for over voltage detection for said power source, such that said two or more voltage comparators are provided for one power source, and
wherein each of said voltage comparators outputs a stop signal to stop an operation of said power source independently of the other voltage comparators.

7. The power source circuit according to claim 6, further comprising means for sending a stop signal to said power supply or a control circuit controlling said power supply when any one of said two or more voltage comparators has detected a predetermined setting voltage set for said voltage comparator.

8. A power supply system comprising the power source circuit according to claim 6.

9. An electronic apparatus comprising the power supply system according to claim 8 and an electronic circuit that operates on power-supply power supplied from said power supply system.

10. The power source circuit according to claim 6,
wherein said voltage comparators receive high and low frequency components,
wherein a first one of said voltage comparators responds to both the high and low frequency components, and
wherein a second one of said voltage comparators responds to the low frequency components but not the high frequency components.

11. The power source circuit according to claim 10, wherein said second one of said voltage comparators includes a capacitor.

12. A power source circuit according to claim 10, wherein a setting voltage for the first one of said voltage comparators is higher than a setting voltage for the second one of said voltage comparators.

13. A power source circuit according to claim 6,
wherein said over voltage detection circuit outputs a digital signal for turning off or on the power circuit in accordance with whether or not an over voltage is detected by the over voltage detector.

14. A redundant parallel power supply system comprising at least two power source circuits,
wherein each of said at least two power source circuits comprises a power source that outputs a DC voltage and an over voltage detection circuit comprising a voltage comparator connected to the power source that detects that the DC voltage output from the power source has reached a predetermined voltage,
wherein each of said over voltage detection circuits has two or more different response speeds and two or more setting voltages each corresponding to one of the response speeds for over voltage detection for said power source to provide two or more independent determinations of an overvoltage condition, wherein said over voltage detection circuit provides said two or more different response speeds and said two or more different setting voltages for one power source, and
wherein said voltage comparator outputs a first stop signal to stop operation of the power source in accordance with one of the different response speeds and one of the different setting voltages, and outputs a second stop signal to stop operation of the power source in accordance with another one of the different response speeds and another one of the different setting voltages, wherein the voltage comparator outputs the first and second stop signals independently of one another.

15. The redundant parallel power supply circuit according to claim 14,
wherein said over voltage detection circuit outputs a digital signal for turning off or on the power circuit in accordance with whether or not an over voltage is detected by the over voltage detector.

16. An electronic apparatus comprising the power supply system according to claim 14 and an electronic circuit that operates on power-supply power supplied from said supply system.

17. A redundant parallel power supply system comprising at least two power source circuits,
wherein each said at least two power source circuits comprises a power source that outputs a DC voltage and an over voltage detection circuit connected to the power source that detects that the DC voltage output from the power source has reached a predetermined voltage, and
wherein each of said over voltage detection circuits comprises two or more voltage comparators to each separately detect an overvoltage condition at the output terminal of the power source circuit, each of said voltage comparators having its own response speed and a setting voltage for over voltage detection for said power source, such that said two or more voltage comparators are provided for one power source, and
wherein each of said voltage comparators outputs a stop signal to stop an operation of said power source independently of the other voltage comparators.

18. The redundant parallel power supply system according to claim 17,
wherein said voltage comparators receive high and low frequency components,
wherein a first one of said voltage comparators responds to both the high and low frequency components, and
wherein a second one of said voltage comparators responds to the low frequency components but not the high frequency components.

19. The redundant parallel power source supply according to claim 18,
wherein said second one of said voltage comparators includes a capacitor.

20. The redundant parallel power supply system according to claim 18,
wherein a setting voltage for the first one of said voltage comparators is higher than a setting voltage for the second one of said voltage comparators.

21. The redundant parallel power supply system according to claim 17,
wherein said over voltage detection circuit outputs a digital signal for turning off or on the power circuit in accordance with whether or not an over voltage is detected by the over voltage detector.

22. An electronic apparatus comprising the power supply system according to claim 17 and an electronic circuit that operates on power-supply power supplied from said supply system.

23. A power source circuit comprising a power source that outputs a DC voltage and an over voltage detection circuit comprising a voltage comparator connected to the power source that detects that the DC voltage output from the power source has reached a predetermined voltage, wherein said over voltage detection circuit has two or more different setting voltages each corresponding to a frequency component of a power supply noise generated in the DC voltage for over voltage detection for said power source, to provide two or more independent determinations of an over voltage condition, wherein said over voltage detection circuit provides said two or more different setting voltages for one power source, wherein said voltage comparator outputs a first stop signal to stop operation of the power source in accordance with one of the different response speeds and one of the different setting voltages, and outputs a second stop signal to stop operation of the power source in accordance with another one of the different response speeds and another one of the different settings voltages, wherein the voltage comparator outputs the first and second stop signals independently of one another.

24. The power source circuit according to claim 23, wherein said over voltage protection circuit outputs a digital signal for turning off n a power circuit in accordance with whether or not an over voltage is detected by the over voltage detector.

* * * * *